United States Patent
Li et al.

(10) Patent No.: US 9,860,049 B2
(45) Date of Patent: Jan. 2, 2018

(54) DOWNLINK CHANNEL TIME DOMAIN POSITION DETERMINATION METHOD AND DEVICE

(71) Applicant: ZTE CORPORATION, Shenzhen, Guangdong Province (CN)

(72) Inventors: Xincai Li, Shenzhen (CN); Bo Dai, Shenzhen (CN); Shuqiang Xia, Shenzhen (CN); Jing Shi, Shenzhen (CN); Kun Liu, Shenzhen (CN); Huiying Fang, Shenzhen (CN)

(73) Assignee: Xi'an Zhongxing New Software Co., Ltd., Xi'an (CN)

( * ) Notice: Subject to any disclaimer, the term of this patent is extended or adjusted under 35 U.S.C. 154(b) by 30 days.

(21) Appl. No.: 14/910,199

(22) PCT Filed: Jun. 17, 2014

(86) PCT No.: PCT/CN2014/080083
§ 371 (c)(1),
(2) Date: Feb. 4, 2016

(87) PCT Pub. No.: WO2014/173372
PCT Pub. Date: Oct. 30, 2014

(65) Prior Publication Data
US 2016/0182209 A1 Jun. 23, 2016

(30) Foreign Application Priority Data

Aug. 5, 2013 (CN) .......................... 2013 1 0337474

(51) Int. Cl.
*H04L 5/00* (2006.01)
*H04L 5/14* (2006.01)
*H04W 72/04* (2009.01)

(52) U.S. Cl.
CPC .......... *H04L 5/0092* (2013.01); *H04L 5/1469* (2013.01); *H04W 72/0446* (2013.01); *H04L 5/008* (2013.01)

(58) Field of Classification Search
CPC . H04W 72/0446; H04L 5/1469; H04L 5/0092
See application file for complete search history.

(56) References Cited

U.S. PATENT DOCUMENTS

2010/0150090 A1    6/2010    Park
2012/0093122 A1*   4/2012    Dai ...................... H04L 5/0053
                                                         370/330

FOREIGN PATENT DOCUMENTS

CN    102891728 A    1/2013
CN    103220809 A    7/2013

OTHER PUBLICATIONS

Alcatel-Lucent et al: "Feasibility of coverage extension of physical channels for MTC devices", 3GPP TSG-RAN WG1 Meeting #72, St. Julian's, Malta, Jan. 28-Feb. 1, 2013, R1-130462.
(Continued)

*Primary Examiner* — Gbemileke J Onamuti
(74) *Attorney, Agent, or Firm* — Plumsea Law Group, LLC

(57) ABSTRACT

A downlink control channel time-domain position determination method and device are disclosed. The method includes: a terminal determining a way for acquiring a time-domain position of a downlink control channel and/or a time-domain starting position of a downlink data channel corresponding to the downlink control channel according to a number of repetitions of resources corresponding to the downlink control channel and/or a downlink channel type; the terminal obtaining the time-domain position of the
(Continued)

downlink control channel and/or the time-domain starting position of the downlink data channel in accordance with the way.

15 Claims, 10 Drawing Sheets

(56)  References Cited

OTHER PUBLICATIONS

Catt: "Text Proposal on coverage improvement for low-cost MTC UEs", 3GPP TSG-RAN WG1 Meeting #72, St. Julian's, Malta, Jan. 28-Feb. 1, 2013, R1-130054.
Qualcomm Incorporated: "Data channel Coverage Enhancement", 3GPP TSG-RAN WG1 #72bis, Chicago, USA, Apr. 15-19, 2013, R1-131399.
MediaTek Inc: "Required system Functionalities for MTC UEs Operating in Enhanced Coverage Mode" 3GPP TSG-RAN WG1 Meeting #72, St. Julian's, Malta, Jan. 28,-Feb. 1, 2013, R1-130218.
Fujitsu: "PBCH related issues of Low-cost MTC UEs based on LTE", 3GPP TSG-RAN WG1 #72bis, Chicago, USA, Apr. 15-19, 2013, R1-131096.
Sony: "PDCCH coverage extension for low-cost MTC UEs by power-density boosting", 3GPP TSG-RAN WG1 #72bis, Chicago, USA,Apr. 15-19, 2013, R1-130960.
"3rd Generation Partnership Project; Technical Specification Group Radio Access Network; Study on Provision of low-cost MTC UEs based on LTR; (Release 12)", May 11, 2013, 3GPP TR 36.888, V2.0.3, XP050698302.
Supplemental European Search Report dated May 24, 2016, in European Patent Application No. 14788179.1.
International Search Report and Written Opinion dated Sep. 19, 2014 in PCT/CN2014/080083.

* cited by examiner

DOWNLINK CHANNEL TIME DOMAIN POSITION DETERMINATION METHOD AND DEVICE

CROSS-REFERENCE TO RELATED APPLICATION(S)

This application is the U.S. National Phase application of PCT application number PCT/CN2014/080083 having a PCT filing date of Jun. 17, 2014, which claims priority of Chinese patent application 201310337474.0 filed on Aug. 5, 2013, the disclosures of which are hereby incorporated by reference.

TECHNICAL FIELD

The present document relates to the field of wireless communications, and more particularly, to a downlink channel time-domain position determination method and device.

BACKGROUND OF RELATED ART

The MTC User Equipment (MTC UE) is also known as an M2M user communication device and is the main application form of the Internet of things at this stage. Smart metering is one of the most typical applications of the MTC device, and most of smart metering type MTC devices are all fixedly installed in environments with low coverage performance such as a basement and so on. In order to ensure that such type of MTC devices can maintain a normal communication with the base station system, usually it is required to deploy additional devices such as sites and relays and so on, which will undoubtedly greatly increase the deployment cost of the carriers. To this end, companies such as Vodafone raised the needs for improving/enhancing the coverage of each physical channel of the smart metering type MTC devices on the premise of without increasing additional device deployments in the technical proposal RP-121282 in the 3GPP RAN.

The Radio Frame (RF) in the LTE system includes frame structures of the Frequency Division Duplex (referred to as FDD) mode and the Time Division Duplex (referred to as TDD) mode.

FIG. 1 is a schematic diagram of the frame structure of the FDD mode in the LTE technology according to the related art, as shown in FIG. 1, a 10 millisecond (ms) radio frame consists of twenty slots whose length is 0.5 ms each and which are numbered 0 to 19, and slots $2i$ and $2i+1$ form a subframe i whose length is 1 ms.

FIG. 2 is a schematic diagram of the frame structure of the TDD mode in the LTE technology according to the related art, as shown in FIG. 2, a 10 ms radio frame consists of two 5 ms half frames, and one half frame includes five subframes whose length is 1 ms each, and the subframe i is defined as the slot $2i$ and the slot $2i+1$ whose length is 0.5 ms each.

In the abovementioned two frame structures, for the Normal Cyclic Prefix (referred to as Normal CP), one slot contains 7 symbols whose length is 66.7 microseconds (us) each, wherein, the CP length of the first symbol is 5.21 us, and the CP length of each of the other six symbols is 4.69 us; for the Extended Cyclic Prefix (referred to as Extended CP), one slot contains six symbols, and the CP length of each of the symbols can be 16.67 us.

FIG. 3 is a schematic diagram of the time-frequency structure of various physical channels of the common downlink subframe in the LTE according to the related art, as shown in FIG. 3, the following several downlink physical channels are defined in the LTE: a Physical Control Format Indicator Channel (PCFICH), a Physical Hybrid Automatic Retransmission Request Indicator Channel (PHICH), a Physical Downlink Control Channel (PDCCH), and a Physical Downlink Shared Channel (PDSCH).

Wherein, when the downlink subframe does not have the PDCCH, there is no need to transmit the PCFICH. When the control format indicator CFI value is greater than 0, the PCFICH needs to be transmitted in the subframe and is located in the first symbol of the downlink subframe, which is used to indicate the number of OFDM symbols occupied by the PDCCH control signaling in one subframe. The set of OFDM symbols that can be used for PDCCH transmission in one subframe is as shown in Table 1.

TABLE 1 the number of OFDM symbols used for the PDCCH

| Subframe | The number of OFDM symbols (CFI value) used for the PDCCH when $N_{RB}^{DL} > 10$ | The number of OFDM symbols (CFI value) used for the PDCCH when $N_{RB}^{DL} \leq 10$ |
| --- | --- | --- |
| For one or two cell-specific antenna ports, MBSFN subframes in the carrier supporting both the PMCH transmission and PDSCH transmission | 1, 2 | 2 |
| For four cell-specific antenna ports, MBSFN subframes in the carrier supporting both the PMCH transmission and PDSCH transmission | 2 | 2 |
| MBSFN subframes in the carrier not supporting the PDSCH transmission | 0 | 0 |
| Other cases | 1, 2, 3 | 2, 3, 4 |

The PHICH is located in the first symbol or the first three symbols of the subframe, and it is used to carry the ACK/NACK feedback information of the uplink PUSCH.

The PDCCH is used to bear Downlink Control Information (referred to as DCI), including: uplink and downlink scheduling information, as well as uplink power control information. The time-domain position starts from the first symbol of the downlink subframe, and the number of symbols occupied is indicated by the PCFICH, and the frequency domain position is mapped to all system bandwidths.

The PDSCH is used to transmit system public messages, paging messages and downlink data, the frequency domain position of the PDSCH in the subframe is indicated by the PDCCH, and its time-domain position starts from the next OFDM symbol in the control area and until the subframe ends. Thus, knowing the number of PDCCH symbols is equivalent to knowing the time domain starting symbol position of the PDSCH in the same subframe.

The content of the control information transmitted in the enhanced PDCCH (referred to as ePDCCH) is the same as that of the original PDCCH, but it is located within the PDSCH area, and its time-domain starting position is the same as that of the PDSCH.

Generally, the order of a terminal receiving downlink subframes is as shown in FIG. 4, first the PBCH is received to obtain information such as the system bandwidth, then the PCFICH is decoded to obtain the CFI information, i.e. information of the number of symbols occupied by the PDCCH and information of the time-domain starting position of the PDSCH, and then the PDCCH is blindly detected in the corresponding subframe area to obtain the DCI, then the PDSCH at the corresponding time-frequency position is decoded according to the indication of the DCI signaling to obtain the downlink data.

In the RAN #60 plenary meeting, the proposal RP-130848 of Vodafone proposed the technical requirements that, for the coverage enhanced MTC UE, functions of a plurality of physical channels can be simplified or be replaced with other channels or mechanisms to be achieved, for example, the PCFICH can be avoided, and functions of the PCFICH are achieved through other solutions. Therefore, on the one hand, the downlink physical channel structure of the coverage enhanced MTC UE can be simplified and continuous decoding errors can be avoided, on the other hand, the consideration of the PCFICH coverage enhancement is also saved, and the coverage enhanced MTC UE will not be limited by the physical channel. But if the channel is removed directly and a corresponding avoidance policy is not given, the complexity of blindly detecting the PDCCH (ePDCCH) will be significantly increased.

Therefore, for the PCFICH channel of the coverage enhanced MTC UE, an alternative avoidance policy must be designed, which not only will not affect the downlink subframe reception of the non-coverage enhanced normal UE, but also needs to ensure that the coverage enhanced MTC terminal still can know the number of symbols occupied by the PDCCH in each downlink subframe or the time-domain starting position of the PDSCH even without decoding the CFICH, thus completing a correct reception of the downlink data.

With respect to the problem of PCFICH avoidance or function substitutions, currently no effective solutions have been put forward.

SUMMARY

In order to solve the problem of a terminal correctly receiving downlink data, the embodiment of the present document proposes a downlink channel time-domain position determination method and device.

A downlink channel time-domain position determination method comprises:

a terminal determining a way for acquiring a time-domain position of a downlink control channel and/or a time-domain starting position of a downlink data channel corresponding to the downlink control channel according to a number of repetitions of resources corresponding to the downlink control channel and/or a downlink channel type;

the terminal acquiring the time-domain position of the downlink control channel and/or the time-domain starting position of the downlink data channel in accordance with the way.

Preferably, the terminal determining the way for acquiring the time-domain position of the downlink control channel and/or the time-domain starting position of the downlink data channel corresponding to the downlink control channel according to the number of repetitions of resources corresponding to the downlink control channel and/or the downlink channel type comprises:

when the number of repetitions is 1, the terminal acquiring the time-domain position of the downlink control channel and/or the time-domain starting position of the downlink data channel according to a PCFICH;

when the number of repetitions is greater than 1, and the downlink control channel and the corresponding downlink data channel are transmitted in a same subframe, the terminal determining the time-domain position of the downlink control channel or the time-domain starting position of the downlink data channel through one of ways of signaling indication, predefinition and blind detection;

when the number of repetitions is greater than 1, and the downlink control channel and the corresponding downlink data channel are transmitted in different subframes, the terminal determining the time-domain position of the downlink control channel through one of ways of the signaling indication, predefinition and blind detection, and determining the time-domain starting position of the downlink data channel through the way of signaling indication or predefinition.

Preferably, the terminal determining the way for acquiring the time-domain position of the downlink control channel and/or the time-domain starting position of the downlink data channel corresponding to the downlink control channel according to the number of repetitions of resources corresponding to the downlink control channel and/or the downlink channel type comprises:

when the number of repetitions is 1 and a system bandwidth is a predefined bandwidth, the terminal acquiring the time-domain position of the downlink control channel and/or the time-domain starting position of the downlink data channel according to the PCFICH;

when the number of repetitions is greater than 1 or the system bandwidth is not the predefined bandwidth, and the downlink control channel and the corresponding downlink data channel are transmitted in the same subframe, the terminal determining the time-domain position of the downlink control channel or the time-domain starting position of the downlink data channel through one of ways of the signaling indication, predefinition and blind detection;

when the number of repetitions is greater than 1 or the system bandwidth is not the predefined bandwidth, and the downlink control channel and the corresponding downlink data channel are transmitted in different subframes, the terminal determining the time-domain position of the downlink control channel through one of ways of the signaling indication, predefinition and blind detection, and determining the time-domain starting position of the corresponding downlink data channel via the way of signaling indication or predefinition.

Preferably, the predefined bandwidth is 1.4M.

Preferably, time-domain positions of a same downlink control channel and/or a same data channel in subframes transmitting a same downlink data channel and/or a same downlink control channel are all the same; or, the subframes transmitting the same downlink control channel and/or the same downlink data channel are divided into subframe sets, and the time-domain positions of the same downlink control channel and/or the same downlink data channel within a same subframe set are all the same.

Preferably, the way of predefinition or blind detection is adopted with regard to a channel with a system public channel type, and the way of signaling indication, predefinition or blind detection is adopted with regard to a UE-specific channel.

Preferably, the signaling indication is borne in a main information block (MIB) transmitted in a physical broadcast channel (PBCH), or borne in a system information block (SIB) transmitted in the downlink data channel, and the SIB is obtained by the terminal directly blindly detecting the downlink data channel.

Preferably, the way of predefinition is the terminal determining the time-domain position of the downlink control channel and/or the time-domain position of the downlink data channel according to at least one of a system bandwidth, a system frame number, a subframe number, a subframe type and a channel type.

Preferably, CFI values of M subframes corresponding to a blind detection of the downlink control channel are all the same, or through a way of predefining set divisions on the subframes, CFI values of subframes within different sets are different, and CFI values of subframes within a same set are the same.

Preferably, when the CFI values of the M subframes corresponding to the downlink control channel are all the same, the way of blind detection is the terminal sequentially trying three possible values CFI={1, 2, 3}/{2, 3, 4} or two possible values {2, 3}/{3, 4}.

Preferably, when the CFI values of the M subframes corresponding to the downlink control channel are distinguished through sets, the way of blind detection is the terminal sequentially trying possible values of a combination of CFI values in each set, calculating a size of a search space, combining and decoding data borne in downlink channels in search spaces corresponding to the M subframes together to check whether DCI is correct or not, until correct DCI is blindly detected or the search spaces are all searched.

Preferably, when the downlink control channel and the corresponding downlink data channel are transmitted in the same subframe, the ways for determining the time-domain position of the downlink control channel and the time-domain position of the downlink data channel are the same;

when the downlink control channel and the corresponding downlink data channel are transmitted in different subframes, the ways for determining the time-domain position of the downlink control channel and the time-domain position of the downlink data channel are configured independently.

Preferably, when control information corresponding to a public message and control information corresponding to a user-specific message are independently borne in downlink control channels of different subframes, the time-domain position of the downlink control channel corresponding to the public message and the time-domain position of the downlink control channel corresponding to the user-specific message are respectively configured independently.

Preferably, the downlink control channel is a PDCCH and/or an ePDCCH.

Preferably, the terminal comprises a coverage enhanced MTC terminal.

The embodiment of the present document further provides a downlink channel time-domain position determination method, which comprises:

a base station determining a way for acquiring a time-domain position of a downlink control channel and/or a time-domain starting position of a downlink data channel according to a number of repetitions of resources corresponding to the downlink control channel and/or a downlink channel type;

the base station transmitting the downlink control channel and the downlink data channel according to the time-domain position of the downlink control channel and/or the time-domain starting position of the downlink data channel determined through the way.

Preferably, the terminal determining the way for acquiring the time-domain position of the downlink control channel and/or the time-domain starting position of the downlink data channel according to the number of repetitions of resources corresponding to the downlink control channel and/or the downlink channel type comprises:

when the number of repetitions is 1, the bases station determining the time-domain position of the downlink control channel and/or the time-domain starting position of the downlink data channel according to a PCFICH;

when the number of repetitions is greater than 1 and the downlink control channel and the corresponding downlink data channel are transmitted in a same subframe, the base station determining the time-domain position of the downlink control channel or the time-domain starting position of the downlink data channel through one of ways of signaling indication, predefinition and blind detection;

when the number of repetitions is greater than 1 and a system bandwidth is not a predefined bandwidth, and the downlink control channel and the corresponding downlink data channel are transmitted in different subframes, the base station determining the time-domain position of the downlink control channel through one of ways of signaling indication, predefinition and blind detection, and determining the time-domain starting position of the corresponding downlink data channel through the way of signaling indication or predefinition.

Preferably, the base station determining the way for acquiring the time-domain position of the downlink control channel and/or the time-domain starting position of the downlink data channel according to the number of repetitions of resources corresponding to the downlink control channel and/or the downlink channel type comprises:

when the number of repetitions is 1 and the system bandwidth is the predefined bandwidth, the base station determining the time-domain position of the downlink control channel and/or the time-domain starting position of the downlink data channel according to the PCFICH;

when the number of repetitions is greater than 1 or the system bandwidth is not the predefined bandwidth, and the downlink control channel and the corresponding downlink data channel are transmitted in the same subframe, the base station determining the time-domain position of the downlink control channel or the time-domain starting position of the downlink data channel through one of ways of signaling indication, predefinition and blind detection;

when the number of repetitions is greater than 1 or the system bandwidth is not the predefined bandwidth, and the downlink control channel and the corresponding downlink data channel are transmitted in different subframes, the base station determining the time-domain position of the downlink control channel through one of ways of signaling indication, predefinition and blind detection, and determining the time-domain starting position of the corresponding downlink data channel through the way of signaling indication or predefinition.

Preferably, the predefined bandwidth is 1.4M.

Preferably, time-domain positions of a same downlink control channel and/or a same data channel in subframes transmitting a same downlink control channel and/or a same data channel are all the same; or, the subframes transmitting the same downlink control channel and/or the same data channel are divided into subframe sets, and the time-domain positions of the same downlink control channel and/or the same data channel within a same subframe set are all the same.

Preferably, the way of predefinition or blind detection is adopted with regard to a channel with a system public channel type, and the way of signaling indication, predefinition or blind detection is adopted with regard to a UE-specific channel.

Preferably, information of the signaling indication is borne in an MIB transmitted in a PBCH, or borne in an SIB transmitted in the downlink data channel.

Preferably, the way of predefinition is the base station determining the time-domain position of the downlink control channel and/or the time-domain position of the downlink data channel according to at least one of a system bandwidth, a system frame number, a subframe number, a subframe type and a channel type.

Preferably, CFI values of M subframes corresponding to a blind detection of the downlink control channel are all the same, or through a way of predefining set divisions on the subframes, CFI values of subframes within different sets are different, and CFI values of subframes within a same set are the same.

Preferably, when the CFI values of the M subframes corresponding to the downlink control channel are all the same, the way of blind detection is a terminal sequentially trying three possible values CFI={1, 2, 3}/{2, 3, 4} or two possible values {2, 3}/{3, 4}.

Preferably, when the CFI values of the M subframes corresponding to the downlink control channel are distinguished through sets, the way of blind detection is the terminal sequentially trying possible values of a combination of CFI values in each set, calculating a size of a search space, combining and decoding data in search spaces corresponding to the M subframes together to check whether DCI is correct or not, until correct DCI is blindly detected or the search spaces are all searched.

Preferably, when the downlink control channel and the corresponding downlink data channel are transmitted in the same subframe, the ways for determining the time-domain position of the downlink control channel and the time-domain position of the downlink data channel are the same;

when the downlink control channel and the corresponding downlink data channel are transmitted in different subframes, the ways for determining the time-domain position of the downlink control channel and the time-domain position of the downlink data channel are configured independently.

The embodiment of the present document further provides a downlink channel time-domain position determination device, which comprises:

a terminal side way determination module, used to: determine a way for acquiring a time-domain position of a downlink control channel and/or a time-domain starting position of a downlink data channel corresponding to the downlink control channel according to a number of repetitions of resources corresponding to the downlink control channel and/or a downlink channel type;

a position determination module, used to acquire the time-domain position of the downlink control channel and/or the time-domain starting position of the downlink data channel in accordance with the way.

Preferably, the terminal side way determination module comprises:

a first execution unit, configured to: when the number of repetitions is 1, make a terminal acquire the time-domain position of the downlink control channel and/or the time-domain starting position of the downlink data channel according to a PCFICH, when the number of repetitions is greater than 1, and the downlink control channel and the corresponding downlink data channel are transmitted in a same subframe, make the terminal determine the time-domain position of the downlink control channel or the time-domain starting position of the downlink data channel through one of ways of signaling indication, predefinition and blind detection, when the number of repetitions is greater than 1, and the downlink control channel and the corresponding downlink data channel are transmitted in different subframes, make the terminal determine the time-domain position of the downlink control channel through one of ways of signaling indication, predefinition and blind detection, and determine the time-domain starting position of the downlink data channel through the way of signaling indication or predefinition.

Preferably, the terminal side way determination module further comprises:

a second execution unit, configured to: when the number of repetitions is 1 and a system bandwidth is a predefined bandwidth, make the terminal obtain the time-domain position of the downlink control channel and/or the time-domain starting position of the downlink data channel according to the PCFICH, when the number of repetitions is greater than 1 or the system bandwidth is not the predefined bandwidth, and the downlink control channel and the corresponding downlink data channel are transmitted in the same subframe, make the terminal determine the time-domain position of the downlink control channel or the time-domain starting position of the downlink data channel through one of ways of signaling indication, predefinition and blind detection, when the number of repetitions is greater than 1 or the system bandwidth is not the predefined bandwidth, and the downlink control channel and the corresponding downlink data channel are transmitted in different subframes, make the terminal determine the time-domain position of the downlink control channel through one of ways of signaling indication, predefinition and blind detection, and determine the time-domain starting position of the corresponding downlink data channel through the way of signaling indication or predefinition.

The embodiment of the present document further provides a downlink channel time-domain position determination device, which comprises:

a network side way determination module, used to determine a way for acquiring a time-domain position of a downlink control channel and/or a time-domain starting position of a downlink data channel according to a number of repetitions of resources corresponding to the downlink control channel and/or a downlink channel type;

a channel transmission module, configured to transmit the downlink control channel and the downlink data channel according to the time-domain position of the downlink control channel and/or the time-domain starting position of the downlink data channel determined by the way.

Preferably, the network side method determination module comprises:

a third execution unit, configured to: when the number of repetitions is 1, make a base station determine the time-domain position of the downlink control channel and/or the time-domain starting position of the downlink data channel according to a PCFICH, when the number of repetitions is greater than 1, and the downlink control channel and the corresponding downlink data channel are transmitted in a same subframe, make the base station determine the time-domain position of the downlink control channel or the time-domain starting position of the downlink data channel through one of ways of signaling indication, predefinition and blind detection, when the number of repetitions is greater than 1 and a system bandwidth is not a predefined bandwidth, and the downlink control channel and the corresponding downlink data channel are transmitted in different subframes, make the base station determine the time-domain position of the downlink control channel through one of ways of signaling indication, predefinition and blind detection, and determine the time-domain starting position of the corresponding downlink data channel through the way of signaling indication or predefinition.

Preferably, the network side way determination module comprises:

a fourth execution unit, configured to: when the number of repetitions is 1 and the system bandwidth is the predefined bandwidth, make the base station determine the time-domain position of the downlink control channel and/or the time-domain starting position of the downlink data channel according to the PCFICH, when the number of repetitions is greater than 1 or the system bandwidth is not the predefined bandwidth, and the downlink control channel and the corresponding downlink data channel are transmitted in the same subframe, make the base station determine the time-domain position of the downlink control channel or the time-domain starting position of the downlink data channel through one of ways of signaling indication, predefinition and blind detection;

when the number of repetitions is greater than 1 or the system bandwidth is not the predefined bandwidth, and the downlink control channel and the corresponding downlink data channel are transmitted in different subframes, make the base station determine the time-domain position of the downlink control channel through one of ways of signaling indication, predefinition and blind detection, and determine the time-domain starting position of the corresponding downlink data channel through the way of signaling indication or predefinition.

The embodiment of the present document further provides a computer program, comprising program instructions, wherein, when the program instructions are executed by a terminal, the terminal can execute the abovementioned method.

The embodiment of the present document further provides a computer program, comprising program instructions, wherein, when the program instructions are executed by a base station, the base station can execute the abovementioned method.

The embodiment of the present document further provides a carrier carrying any one of the abovementioned computer programs.

The embodiment of the present document provides a downlink channel time-domain position determination method and device, a terminal or a base station determines way for acquiring a time-domain position of a downlink control channel and/or a time-domain starting position of a downlink data channel corresponding to the downlink control channel according to the number of repetitions of resources corresponding to the downlink control channel and/or the downlink channel type, and then acquires the time-domain position of the downlink control channel and/or the time-domain starting position of the downlink data channel in accordance with the way. With the technical solution provided in the embodiment of the present document, a coverage enhanced MTC terminal can be not subject to the PCFICH, and it still can determine the time-domain position of the downlink control channel as well as the time-domain starting position of the downlink data channel even without decoding the PCFICH channel in advance and correctly demodulate the downlink control and data channels, which achieves that the terminal correctly judges the time-domain position of the downlink channel, and solves the problem of the terminal correctly receiving the downlink data.

PREFERRED EMBODIMENTS

In order to solve the problem of a terminal correctly receiving downlink data, the embodiment of the present document provides a downlink channel time-domain position determination method. Hereinafter, in conjunction with the accompanying drawings, the embodiments of the present document will be described in detail. It should be noted that in the case of no conflict, the embodiments in the present document and the features in the embodiments may be arbitrarily combined with each other.

First, in conjunction with the accompanying drawings, the embodiment 1 of the present document will be described.

Figure 5:
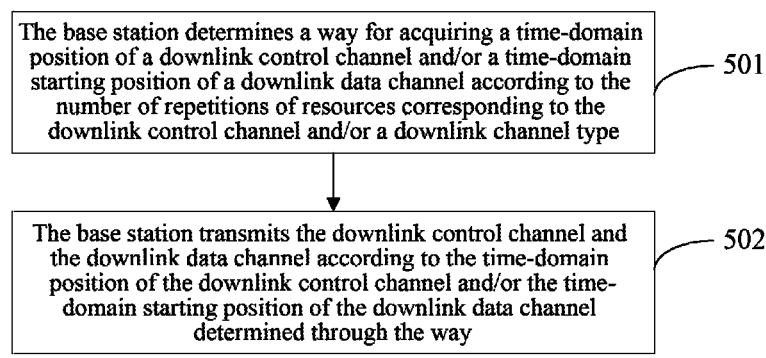
FIG. 5 is a flow chart of base station side processing in a downlink channel time-domain position determination way provided in the embodiment 1 of the present document.

The embodiment of the present document provides a downlink channel time-domain position determination method. First, at the network side, the base station is taken as an example to describe the flow of determining a time-domain position of a downlink channel. As shown in FIG. 5, the following steps are included:

in step 501, the base station determines a way for acquiring a time-domain position of a downlink control channel and/or a time-domain starting position of a downlink data channel according to the number of repetitions of resources corresponding to the downlink control channel and/or the downlink channel type;

the present step may include:

when the number of repetitions is 1, the base station determining the time-domain position of the downlink control channel and/or the time-domain starting position of the downlink data channel according to the PCFICH;

when the number of repetitions is greater than 1, and the downlink control channel and the corresponding downlink data channel are transmitted in the same subframe, the base station determining the time-domain position of the downlink control channel or the time-domain starting position of the downlink data channel through one of ways of signaling indication, predefinition and blind detection;

when the number of repetitions is greater than 1 and the system bandwidth is not a predefined bandwidth, and the downlink control channel and the corresponding downlink data channel are transmitted in different subframes, the base station determining the time-domain position of the downlink control channel through one of ways of signaling indication, predefinition and blind detection, and determining the time-domain starting position of the corresponding downlink data channel through the way of signaling indication or predefinition.

Preferably, the step may also include:

when the number of repetitions is 1 and the system bandwidth is a predefined bandwidth, the base station determining the time-domain position of the downlink control channel and/or the time-domain starting position of the downlink data channel according to the PCFICH;

when the number of repetitions is greater than 1 or the system bandwidth is not the predefined bandwidth, and the downlink control channel and the corresponding downlink data channel are transmitted in the same subframe, the base station determining the time-domain position of the downlink control channel or the time-domain starting position of the downlink data channel through one of ways of signaling indication, predefinition and blind detection;

when the number of repetitions is greater than 1 or the system bandwidth is not the predefined bandwidth, and the downlink control channel and the corresponding downlink data channel are transmitted in different subframes, the base station determining the time-domain position of the downlink control channel through one of ways of signaling indication, predefinition and blind detection, and determining the time-domain starting position of the corresponding downlink data channel through the way of signaling indication or predefinition.

Preferably, the predefined bandwidth is 1.4M.

Preferably, the time-domain positions of the same downlink control channel and/or the same data channel in subframes transmitting the same downlink control channel and/or the same data channel are all the same; or, the subframes transmitting the same downlink control channel and/or the same downlink data channel are divided into subframe sets, and the time-domain positions of the same downlink control channel and/or the same data channel within the same subframe set are all the same.

The way of predefinition or blind detection is adopted with regard to a channel with a system public channel type, and the way of signaling indication, predefinition or blind detection is adopted with regard to a UE-specific channel;

information of the signaling indication is borne in an MIB transmitted in a PBCH, or borne in an SIB transmitted in a downlink data channel.

The way of predefinition is the base station determining the time-domain position of the downlink control channel and/or the time-domain position of the downlink data channel according to at least one of a system bandwidth, a system frame number, a subframe number, a subframe type and a channel type.

CFI values of M subframes corresponding to a blind detection of the downlink control channel are all the same, or through the way of predefining set divisions on the subframes, CFI values of subframes within different sets are different, and CFI values of subframes within the same set are the same.

When the CFI values of the M subframes corresponding to the downlink control channel are all the same, the way of blind detection is the terminal sequentially trying three possible values CFI=$\{1, 2, 3\}/\{2, 3, 4\}$ or two possible values $\{2, 3\}/\{3, 4\}$.

When the CFI values of the M subframes corresponding to the downlink control channel are distinguished through the sets, the way of blind detection is the terminal sequentially trying possible values of a combination of the CFI values in each set, calculating the size of the search space, combining and decoding data in search spaces corresponding to the M subframes together to check whether the DCI is correct or not, until the correct DCI is blindly detected or the search spaces are all searched.

When the downlink control channel and the corresponding downlink data channel are transmitted in the same subframe, the ways for determining the time-domain position of the downlink control channel and the time-domain position of the downlink data channel are the same;

when the downlink control channel and the corresponding downlink data channel are transmitted in different subframes, the ways for determining the time-domain position of the downlink control channel and the time-domain position of the downlink data channel are configured independently.

In step 502, the base station transmits the downlink control channel and the downlink data channel according to the time-domain position of the downlink control channel and/or the time-domain starting position of the downlink data channel determined through the way.

Figure 6:
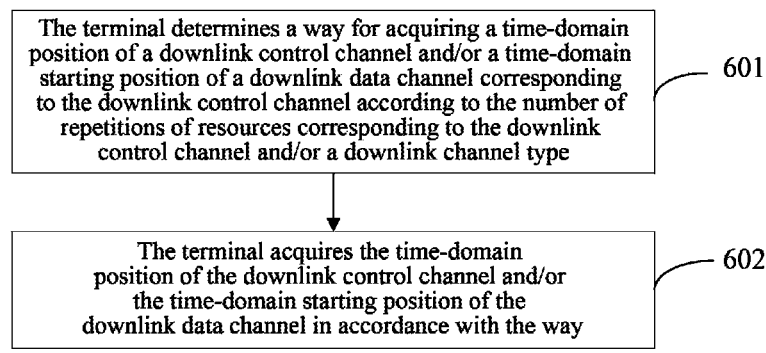
FIG. 6 is a flow chart of terminal side processing in a downlink channel time-domain position determination way provided in the embodiment 1 of the present document.

In contrast, at the terminal side, it also needs to determine the time-domain position of the downlink channel to correctly receive the channel, and the flow is as shown in FIG. 6, and the following steps are included:

in step 601, the terminal determines a way for acquiring the time-domain position of the downlink control channel and/or the time-domain starting position of a downlink data channel corresponding to the downlink control channel according to the number of repetitions of resources corresponding to the downlink control channel and/or the downlink channel type;

the present step may include:

when the number of repetitions is 1, the terminal acquiring the time-domain position of the downlink control channel and/or the time-domain starting position of the downlink data channel according to the PCFICH;

when the number of repetitions is greater than 1, and the downlink control channel and the corresponding downlink data channel are transmitted in the same subframe, the terminal determining the time-domain position of the downlink control channel or the time-domain starting position of the downlink data channel through one of ways of signaling indication, predefinition and blind detection;

when the number of repetitions is greater than 1, and the downlink control channel and the corresponding downlink data channel are transmitted in different subframes, the terminal determining the time-domain position of the downlink control channel through one of ways of signaling indication, predefinition and blind detection, and determining the time-domain starting position of the downlink data channel through the way of signaling indication or predefinition.

Preferably, the step may also include:

when the number of repetitions is 1 and the system bandwidth is a predefined bandwidth, the terminal acquiring the time-domain position of the downlink control channel and/or the time-domain starting position of the downlink data channel according to the PCFICH;

when the number of repetitions is greater than 1 or the system bandwidth is not the predefined bandwidth, and the downlink control channel and the corresponding downlink data channel are transmitted in the same subframe, the terminal determining the time-domain position of the downlink control channel or the time-domain starting position of the downlink data channel through one of ways of signaling indication, predefinition and blind detection;

when the number of repetitions is greater than 1 or the system bandwidth is not the predefined bandwidth, and the downlink control channel and the corresponding downlink data channel are transmitted in different subframes, the terminal determining the time-domain position of the downlink control channel through one of ways of signaling indication, predefinition and blind detection, and determining the time-domain starting position of the corresponding downlink data channel through the way of signaling indication or predefinition.

The way of predefinition or blind detection is adopted with regard to a channel with a system public channel type, and the way of signaling indication, predefinition or blind detection is adopted with regard to a UE-specific channel.

The signaling indication is borne in an MIB transmitted in the PBCH, or borne in an SIB transmitted in the downlink data channel, and the SIB is obtained by the terminal directly blindly detecting the downlink data channel.

Preferably, the way of predefinition is the terminal determining the time-domain position of the downlink control channel and/or the time-domain position of the downlink data channel according to at least one of the system bandwidth, the system frame number, the subframe number, the subframe type and the channel type.

Preferably, CFI values of M subframes corresponding to the blind detection of the downlink control channel are all the same, or through the way of predefining set divisions on the subframes, CFI values of subframes within different sets are different, and CFI values of subframes within the same set are the same.

When the CFI values of the M subframes corresponding to the downlink control channel are all the same, the way of blind detection is the terminal sequentially trying three possible values CFI={1, 2, 3}/{2, 3, 4} or two possible values {2, 3}/{3, 4}.

When the CFI values of the M subframes corresponding to the downlink control channel are distinguished through the sets, the way of blind detection is the terminal sequentially trying possible values of a combination of the CFI values in each set, calculating the size of the search space, combining and decoding data in search spaces corresponding to the M subframes together to check whether the DCI is correct or not, until the correct DCI is blindly detected or the search spaces are all searched.

When the downlink control channel and the corresponding downlink data channel are transmitted in the same subframe, the ways for determining the time-domain position of the downlink control channel and the time-domain position of the downlink data channel are the same;

when the downlink control channel and the corresponding downlink data channel are transmitted in different subframes, the ways for determining the time-domain position of the downlink control channel and the time-domain position of the downlink data channel are configured independently.

When control information corresponding to a public message and control information corresponding to a user-specific message are independently borne in the downlink control channels of different subframes, the time-domain position of the downlink control channel corresponding to the public message and the time-domain position of the downlink control channel corresponding to the user-specific message are respectively configured independently.

The downlink control channel is a PDCCH and/or an ePDCCH.

The terminal contains but is not limited to a coverage enhanced MTC terminal.

In step 602, the terminal acquires the time-domain position of the downlink control channel and/or the time-domain starting position of the downlink data channel in accordance with the way.

In the following, in conjunction with the accompanying drawings, the embodiment 2 of the present document will be described.

The embodiment of the present document provides a downlink channel time-domain position determination method, and in the following, the flow of using this method to determine the time-domain position of the downlink control channel or the time-domain starting position of the data channel through the signaling indication in the Frequency Division Duplexing (FDD) system will be described. The signaling indication in the embodiment of the present document is borne in the MIB.

Figure 7:
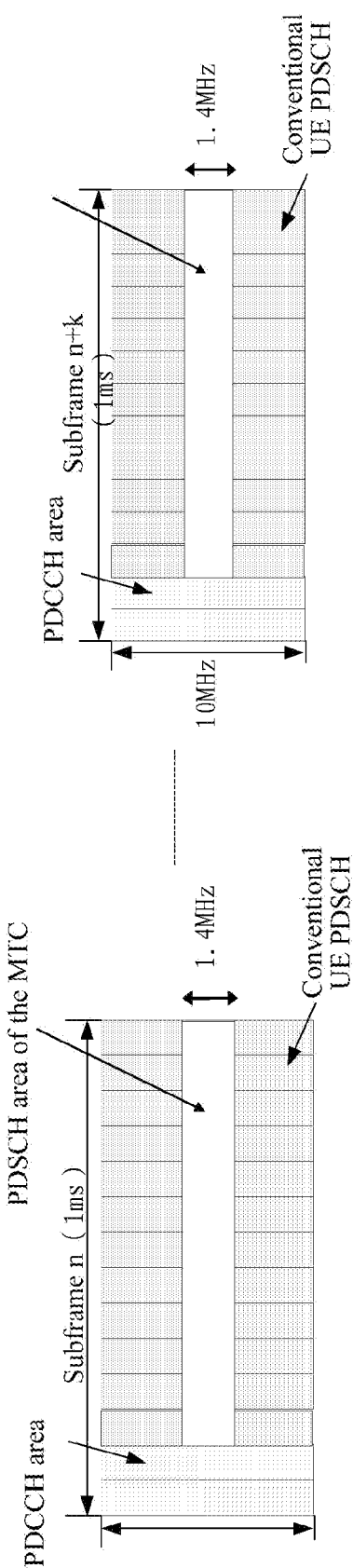
FIG. 7 is a schematic diagram of the channel structure of a downlink subframe indicated by a signaling in the embodiment 2 of the present document.

That is, the control and data of the same terminal are transmitted in the same subframe, that is, the common intra-frame scheduling. Moreover, the number of symbols occupied by the control channels in a plurality of subframes where the control information is repeated is the same. For example, the subframe structures of the downlink subframe control and data channels are as shown in FIG. 7, the system bandwidth is 10 MHz, and each subframe control channel occupies 2 OFDM symbols, and the same control information of the same UE is repeatedly transmitted in k+1 consecutive subframes, and K is a positive integer.

The transmission and reception process of the downlink subframe is as follows:

first, the base station transmits a signaling indicating the number of symbols occupied by the control channel to the terminal via the PBCH.

The number of symbols occupied by the downlink control channel can be indicated with 2 bit, for example, 00 indicates that the subframe does not contain the PDCCH, 01 indicates that the control channel occupies one symbol, 10 indicates 2 symbols, and 11 denotes 3 symbols, alternatively, the terminal finally determines the number of symbols occupied by the control channel according to the size of the system bandwidth as well as the information. If the system bandwidth is 1.4 MHz, the number of symbols occupied by the downlink control channel needs to be added by one on the basis of the abovementioned value. The information takes up 2 bits in the reserved 10 bits of the MIB information.

Then, after the coverage enhanced terminal receives the PBCH in the downlink subframe 0, it determines that the number of symbols occupied by the downlink control channel is 2 according to the system bandwidth information and the two-bit information of '10' in the reserved bits of the MIB.

Then, when receiving the downlink data, it does not need to decode the PCFICH, while directly and blindly detects its own DCI information in the first two symbols, and then knows the time domain starting symbol positions of the PDSCH as well as the ePDCCH.

Herein, for the coverage enhanced terminal, the control and data repeated in the K+1 subframes need to be respectively accumulated and combined and decoded together.

However, when a traditional terminal receives the downlink channel, it needs to decode the PCFICH channel first in the first OFDM symbol, and then obtains the number of symbols occupied by the downlink control channel, and then detects and receives the downlink control channel.

In the following, in conjunction with the accompanying drawings, the embodiment 3 of the present invention will be described.

The embodiment of the present document provides a downlink channel time-domain position determination method, still the way for determining the time-domain positions of the downlink control channel and the downlink data channel by means of signaling will be described, and the signaling is borne in the SIB of the blindly-detected public messages to be transmitted. Meanwhile, the downlink control channel and the downlink data channel of the same terminal are still transmitted in the same subframe, and the information of the downlink control channel only contains the user-specific control information.

At this point, transmission information of some public messages such as the SIB, paging and RAR does not require the PDCCH signaling to indicate the frequency domain position of the subframe, but it is directly transmitted to the user equipment through the PDSCH.

At this point, the PDSCH carrying transmission public information of the SIB, and/or the paging, and/or the RAR is transmitted in predefined subframes such as the subframe 0 and/or the subframe 5, the RNTI is also a preset value, and the size of the transport block is preset, and the blind detection is performed in the predefined downlink bandwidth through the RB level.

The process of the terminal decoding the downlink control and data information is as follows:

first, the terminal obtains public messages such as the SIB as well as information of the number of the symbols occupied by the control channel borne thereon through the way of blind detection, and the information can still be represented by two bits.

Then, after obtaining the information, the terminal searches for the user specific control information in the user specific space of the area where the downlink control channel is located, and decodes the PDSCH at the corresponding frequency domain position of the same subframe according to the control information to obtain the user specific downlink data.

In addition, when the public messages are obtained by blindly detecting the data channels, the specific control information also can be borne through the ePDCCH, at this time, the time-domain starting position of the ePDCCH is obtained through the way of predefinition or blind detection. At this time, the time-domain position of starting the blind detection of the downlink data channel also can be determined at the same time.

Through the abovementioned two embodiments, it can be seen that by adding the signaling, the coverage enhanced MTC terminal is not subject to the PCFICH channel, thus reducing the complexity of decoding the downlink subframe and achieving the purpose of avoiding the PCFICH channel.

In the following, in conjunction with the accompanying drawings, the embodiment 4 of the present document will be described.

The embodiment of the present document provides a downlink channel time-domain position determination method. In the following, the flow of using the method to determine the time-domain position of the downlink control channel or the time-domain starting position of the downlink data channel through the way of predefinition in the Time Division Duplexing (TDD) system will be described. In the embodiment of the present document, the terminal determines the number of symbols occupied by the control channel in the subframes through the system bandwidth. Herein, the downlink subframes are not consecutive due to the restrictions of the TDD downlink and uplink subframe configurations.

For example, the predefined mapping relationship between the system bandwidth and the number of PDCCH symbols is as shown in Table 2 below.

TABLE 2

A corresponding relationship table of the system bandwidth and the number of PDCCHs

| System Bandwidth (MHz) | The number of PDCCH symbols |
| --- | --- |
| 20 | 1 |
| 15 | 2 |
| 10 | 3 |
| 5 | 2 |
| 3 | 3 |
| 1.4 | 4 |

Thus, the terminal can know the number of symbols of the control channel through the system bandwidth information in the PBCH. For example, the system bandwidth is 10 MHz, the number of symbols occupied by the PDCCH should be three. If the system bandwidth in the PBCH newly received later is changed, the number of PDCCH symbols in the subframe is also changed accordingly.

In addition, the predefined mapping relationship between the system bandwidth and the number of PDCCH symbols can also be as shown in the following Table 3.

TABLE 3

A corresponding relationship table of the system bandwidth and the number of PDCCHs

| System Bandwidth (MHz) | The number of PDCCH symbols |
| --- | --- |
| 20 | 2 |
| 15 | 1 |
| 10 | 2 |
| 5 | 3 |
| 3 | 3 |
| 1.4 | 3 |

The abovementioned two tables are only one case, and there may also be other configuration forms, which are not listed here. Meanwhile, when the coverage enhanced MTC terminal decodes the downlink subframe, there is no need to decode the PCFICH, and the time-domain position of the PDCCH as well as the time-domain starting position of the PDSCH in the same subframe is determined according to the abovementioned mapping table.

In the following, in conjunction with the accompanying drawings, the embodiment 5 of the present document will be described.

The embodiment of the present document provides a downlink channel time-domain position determination method, and describes a method for determining the time-domain position occupied by the downlink control channel or the time-domain starting position of the data channel in the FDD system through the system frame number, the control and data information of the same coverage enhanced MTC terminal is transmitted in different subframes through the time division mode of the subframe, that is, the cross-subframe scheduling mode is adopted.

For example, when the radio frame number is predefined as a multiple of a certain number or an offset of the multiple of the number, that is, SFN % n=k, n and k are natural numbers, and the number of PDCCH symbols is m (0<=m<=4).

For example, it is to predefine that, when the SFN is an integer multiple of 20, that is, SFN=20, 40, 60, 80, 100 . . . , the number of PDCCHs is 2; when the SFN is an integer multiple of 20 plus 3, that is, SFN=23, 43, 63, 83, 103 . . . , the number of PDCCHs is 3, . . . .

Figure 8:
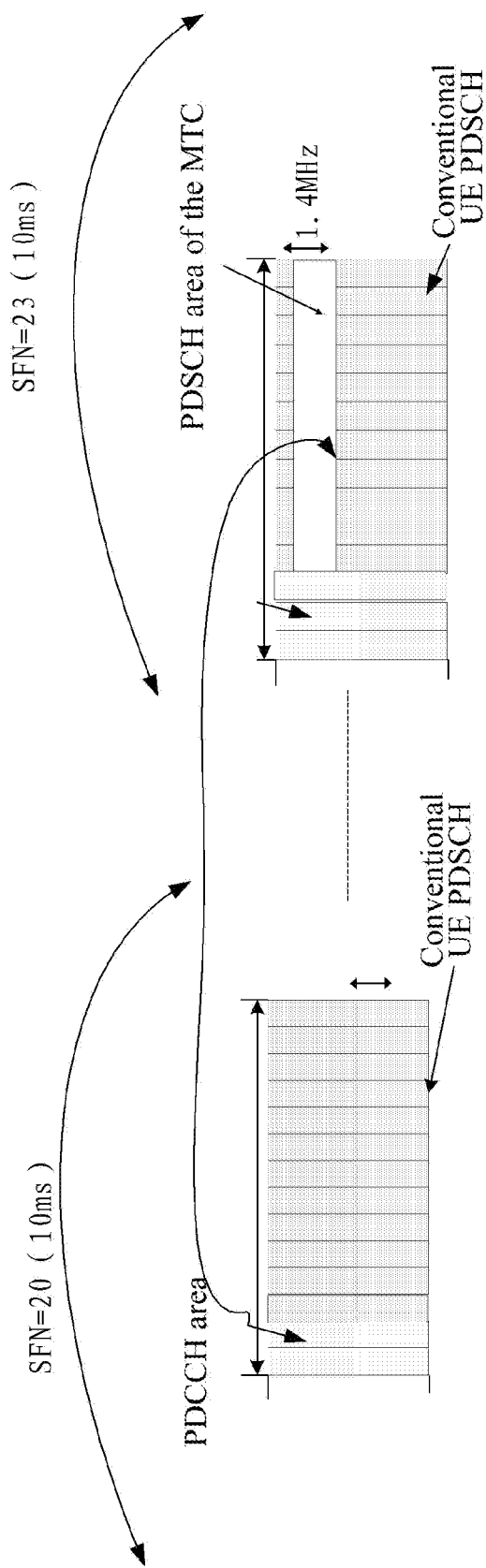
FIG. 8 is a schematic diagram of the structure of a downlink subframe determined by a system frame number in the embodiment 4 of the present document.

The structure of the downlink subframe is as shown in FIG. 8, the number of symbols occupied by all the downlink control channels of SFN=20 is two, and the number of symbols occupied by all the downlink control channels of SFN=23 is three. The control information of the MTC UE is transmitted repeatedly in 10 subframes starting from the first subframe of SFN=20, and the data information starts is repeatedly transmitted starting from the first subframe of SFN=23.

When receiving the downlink data, the terminal first occupies two symbols to calculate the search space according to the control information, then combines and decodes the data in the search spaces of the first two symbols of the 10 subframes of SFN=20, and obtains the downlink control information of the terminal through the blind detection. Then the downlink data channel is received at the corresponding time-frequency position when SFN=23 in accordance with the frequency domain position indication information as well as the time-domain starting position predefinition information of the downlink data channel of the downlink control information.

In the following, in conjunction with the accompanying drawings, the embodiment 6 of the present document will be described.

The embodiment of the present document provides a downlink channel time-domain position determination method, and it is to describe a method for determining the time-domain starting position of the PDSCH by means of predefining the subframe number when the downlink control channel and the downlink data channel of the same terminal are not transmitted in the same subframe.

Figure 9:
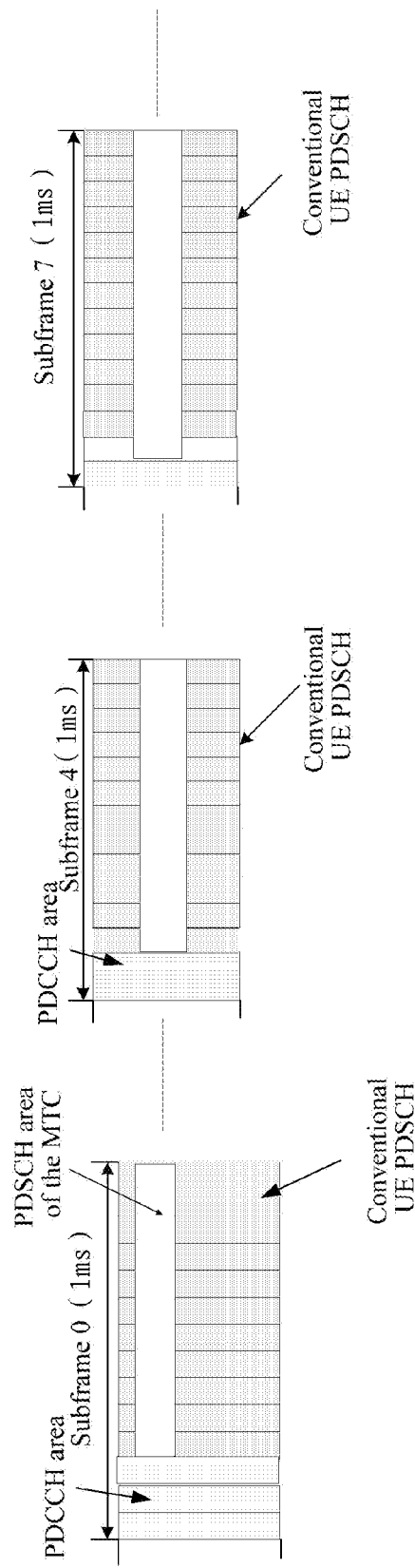
FIG. 9 is a schematic diagram of the structure of a downlink subframe determined via a subframe number in the embodiment 6 of the present document.

The subframes are divided into a plurality of sets, the time-domain starting positions of the PDSCHs of the subframes within the same set are the same, the time-domain starting positions of the PDSCHs of the subframes within different sets are different, the time-domain starting position of the PDSCH is fixed through the way of predefinition in each set, for example, in the subframes {0, 1, 2, 3}, the PDSCH fixedly starts from the fourth symbol; in the subframes {4, 5, 6}, it fixedly starts from the third symbol; in the subframes {7, 8, 9}, it fixedly starts from the second symbol. The time-domain position of the PDSCH can be as shown in FIG. 9. In addition, the subframes within the same set may also be non-adjacent.

After receiving the downlink subframes, the terminal determines the time-domain starting position of the PDSCH of each subframe through a predefined relationship between the subframe number and the time-domain starting position of the PDSCH, and the frequency domain position is still indicated through the signaling of the downlink control channel.

At this time, the subframe time-domain position of the downlink control channel corresponding to the downlink data channel can be determined independently by using any one of the three ways in the embodiments of the present document. It still needs to decode the PDCCH before receiving the corresponding PDSCH.

In the following, in conjunction with the accompanying drawings, the embodiment 7 of the present document will be described.

The embodiment of the present document provides a downlink channel time-domain position determination method, and the case of determining the time-domain position of the downlink control channel through the way of blind detection provided in the embodiment of the present document in the FDD system will be described in detail.

Furthermore, the control information of the terminal is repeatedly transmitted in 10 consecutive or non-consecutive subframes, moreover, the number of symbols occupied by the downlink control channels of the 10 subframes is the same, the downlink control channels of the 10 subframes all occupy three OFDM symbols, and the control of the public messages and the user-specific messages is contained. Because herein the terminal preferably considers the coverage enhanced MTC terminal, it is difficult to perform correct decoding only by decoding the control information of one subframe, and the data of the 10 subframes need to be combined and decoded together in order to guarantee the performance.

Figure 10:
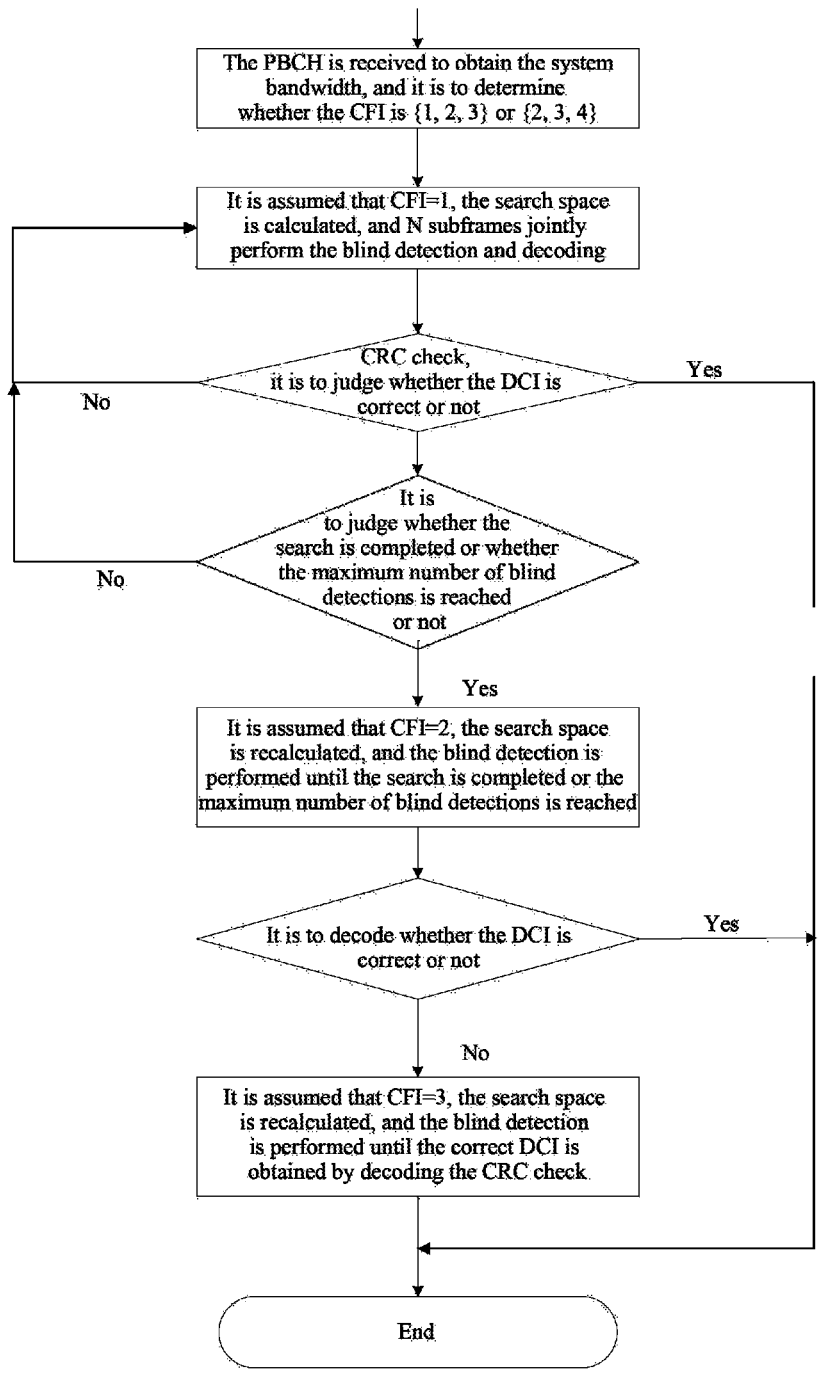
FIG. 10 is a flow chart of determining the number of symbols occupied by the downlink control channel through a way of blind detection in the embodiment 7 of the present document.

The process of the terminal determining the number of a plurality of downlink control channel symbols through the way of blind detection is as shown in FIG. 10.

First, the terminal knows the size of the system bandwidth through the received PBCH, if the system bandwidth is greater than 1.4 MHz, the number of downlink control channel symbols has three possibilities: 1, 2, or 3, and if the system bandwidth is less than 1.4 MHz, it also has three possibilities: 2, 3, 4. It is assumed that the system bandwidth herein is 5 MHz, i.e., the number of symbols occupied by the downlink control channel is 1 or 2 or 3. However, the terminal does not know whether the number of occupied OFDM symbols is one or two or three, therefore it needs to continuously try the blind detection.

Before the blind detection, it knows that the CRC of the DCI of the UE is scrambled with which type of RNTI through the upper layer configuration. The number of blind detections is associated with the following factors: 1) how many values of the aggregation level of the search space, 2) containing of possible DCI formats, 3) the total number of CCEs in the blind detection range.

Then, the terminal starts to try from CFI=1, that is, the downlink control channel occupies one symbol, and the total number N of CCEs and the starting CCE index of the user specific search space are calculated. Then the data in the public search space and the specific search space of the 10 subframes are combined and blindly detected by using the existing DCI blind detection technology, and it is to see whether the correct public message and the user specific control information are obtained or not through the RNTI+

CRC check, and the search spaces are constantly traversed, if the decoding is correct in the middle or until the traverse is finished, it demonstrates that the assumption of CFI=1 is correct, the blind detection is stopped, and it is determined that the number of symbols occupied by the control channel is 1, if the correct control information is still not obtained when the maximum number of blind detections 44 is reached, it demonstrates that the assumption of CFI=1 is wrong, and it needs to continue to assume and try.

Then, it is assumed that CFI=2, that is, the downlink control channel occupies two symbols, the blind detection process is consistent with the process of the above CFI=1, and it is to see whether the correct DCI information is obtained or not by constantly trying the blind detection, if the decoding is correct in the middle of process, it proves that the assumption of CFI=2 is correct, and the blind detection ends. If the correct control information is not decoded when the maximum number of blind detections 44 is reached, it indicates that the CFI=2 is also wrong, and it needs to continue to try the blind detection of CFI=3, the method is still the same as the above, until the correct DCI information is obtained through the blind detection.

Therefore, 10 subframes can take up to 44*3=132 blind detections. Of course, if the number of symbols occupied by the downlink control channel is 1, a maximum of 44 blind detections is required to obtain the correct DCI information of the UE. Therefore, the accurate DCI can be obtained by detecting up to 3 times of DCI detections of a single subframe, which not only enhances the coverage, but also reduces the complexity compared to the single subframe detection.

In the following, in conjunction with the accompanying drawings, the embodiment 8 of the present document will be described.

The embodiment of the present document provides a downlink channel time-domain position determination method, and it is to explain and describe the case of performing determination with the blind detection method provided in the embodiment of the present document in the case that the number of symbols occupied by the downlink control channel of each subframe where the downlink control information is repeatedly transmitted is different in the FDD system.

It is assumed that the control information of the terminal is repeatedly transmitted in 12 consecutive subframes starting from the subframe 0, that is, the subframe numbers are {0, 1, 2, 3, 4, 5, 6, 7, 8, 9, 0, 1}, and the number of symbols occupied by the downlink control channel of each subframe of the 12 subframes may have three possibilities, if trying is performed respectively for each subframe according to CFI=1, 2, 3, and the 12 subframes are then combined, then the number of needed blind detections will increase with the exponential power of the number of subframes. To reduce the number of blind detections and the complexity, the CFI values of the 12 subframes have a predetermined relationship, or there is a restriction condition on the maximum number of blind detections. It is assumed herein that the number of symbols occupied by every four consecutive downlink control channels is the same, for example, the downlink control channel of the first group of subframes {0, 1, 2, 3} occupies one symbol, the downlink control channel of the second group of subframes {4, 5, 6, 7} occupies two symbols, and the downlink control channel of the third group of subframes {8, 9, 0, 1} occupies three symbols. But the terminal only knows which subframes are the same but does not know the number of occupied symbols, which needs to be determined through constant blind detections. The process is as follows:

first, the terminal assumes that the first group of subframes is under CFI=1, the second group is under CFI=2, and the third group is under CFI=3, then calculates the total number of CCEs in each group and the search space, and combines, demodulates and decodes the data mapped from the decoded resources on the CCEs corresponding to the 12 subframes, and judges whether the CRC check is correct or not, if the CRC check is correct, then it demonstrates that the assumption is correct, and if the CRC check is not correct, it continues to search, and combines, demodulates and decodes the data, until the CRC check is correct or the search is completed.

If the search spaces of all the subframes under the assumed condition are all searched and the correct DCI is still not decoded, the assumption is proved to be wrong, and it needs to continue the subsequent blind detection attempts. For example, it tries the assumption that the first group is under CFI=2, the second group is under CFI=1, and the third group is under CFI=3, and the blind detection process is similar to the above, if the correct DCI is still not obtained when the search is finally completed, then it continues the blind detection attempts of different CFI combinations of each group of subframes. For {3, 1, 2}, {3, 2, 1}, {1, 3, 2}, {2, 3, 1}, a total of six possible combinations, a maximum of 6*44 blind detections is needed to determine the number of symbols occupied by the downlink control channels of the 12 subframes, there is no need to decode the PCFICH channel of each subframe, and the purpose of enhancing the DCI coverage is achieved.

It should be emphasized that the way of blind detection in the embodiments 6 and 7 of the present document is only used to determine the time-domain position of the downlink control channel, when the downlink control channel and the corresponding downlink data channel of the same terminal are transmitted in different subframes, the subframe time-domain starting position of the downlink data channel is determined through the way of signaling indication or predefinition.

In the following, in conjunction with the accompanying drawings, the embodiment 9 of the present document will be described.

The embodiment of the present document provides a downlink channel time-domain position determination method, and the present embodiment describes the number of symbols occupied by the downlink control channels of the user specific messages as well as the public messages contained in the control information.

When the public messages and the user specific messages are scheduled through different PDCCHs, the numbers of symbols occupied by the PDCCHs corresponding to the public messages and the user specific messages in the subframes where the PDCCHs are located can be configured individually, and the determination way of the terminal can be any one of the three ways in the present document. That is, the terminal determines the number of symbols occupied by the downlink control channel of each message through the signaling or the predefinition way or the blind detection way.

In the following, in conjunction with the accompanying drawings, the embodiment 10 of the present document will be described.

The embodiment of the present document provides a downlink channel time-domain position determination method, and the embodiment describes a method for determining the time-domain position of the same downlink control channel or the time-domain starting position of the downlink data channel in the TDD system through the subframe type.

Figure 1:
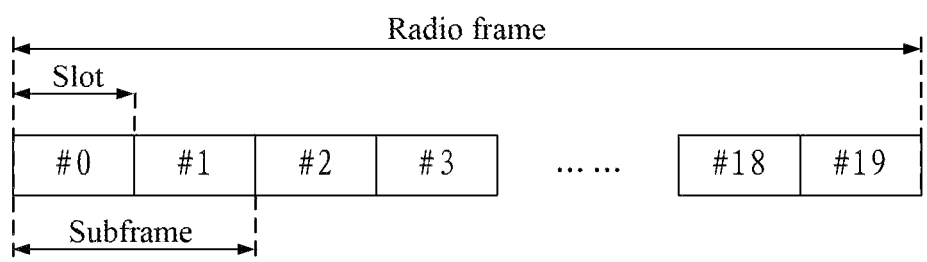
FIG. 1 is a schematic diagram of a frame structure of an FDD mode in the LTE system.
Figure 2:
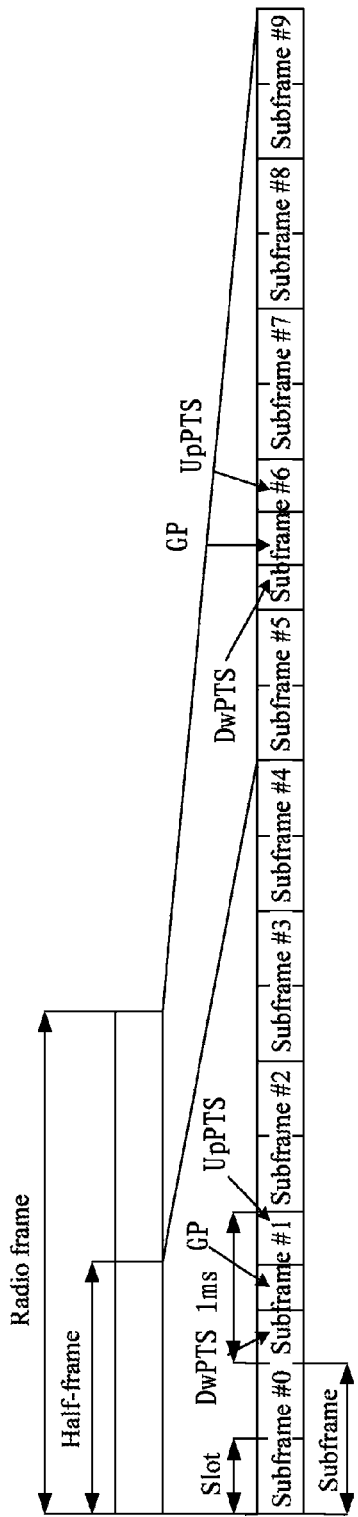
FIG. 2 is a schematic diagram of a frame structure of a TDD mode in the LTE system.
Figure 3:
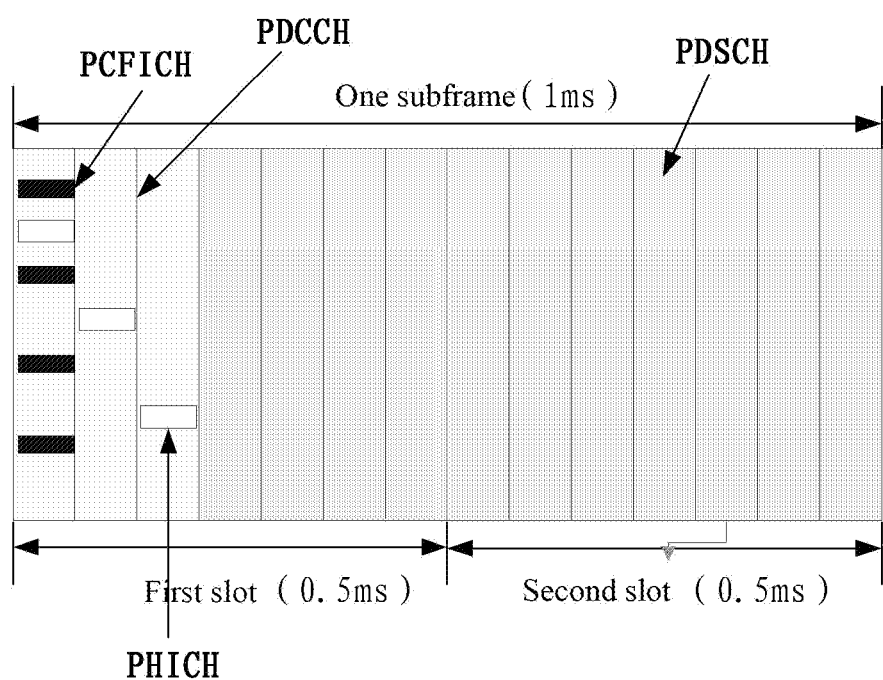
FIG. 3 is a schematic diagram of a time-frequency structure of various physical channels in a common downlink subframe in the LTE system.
Figure 4:
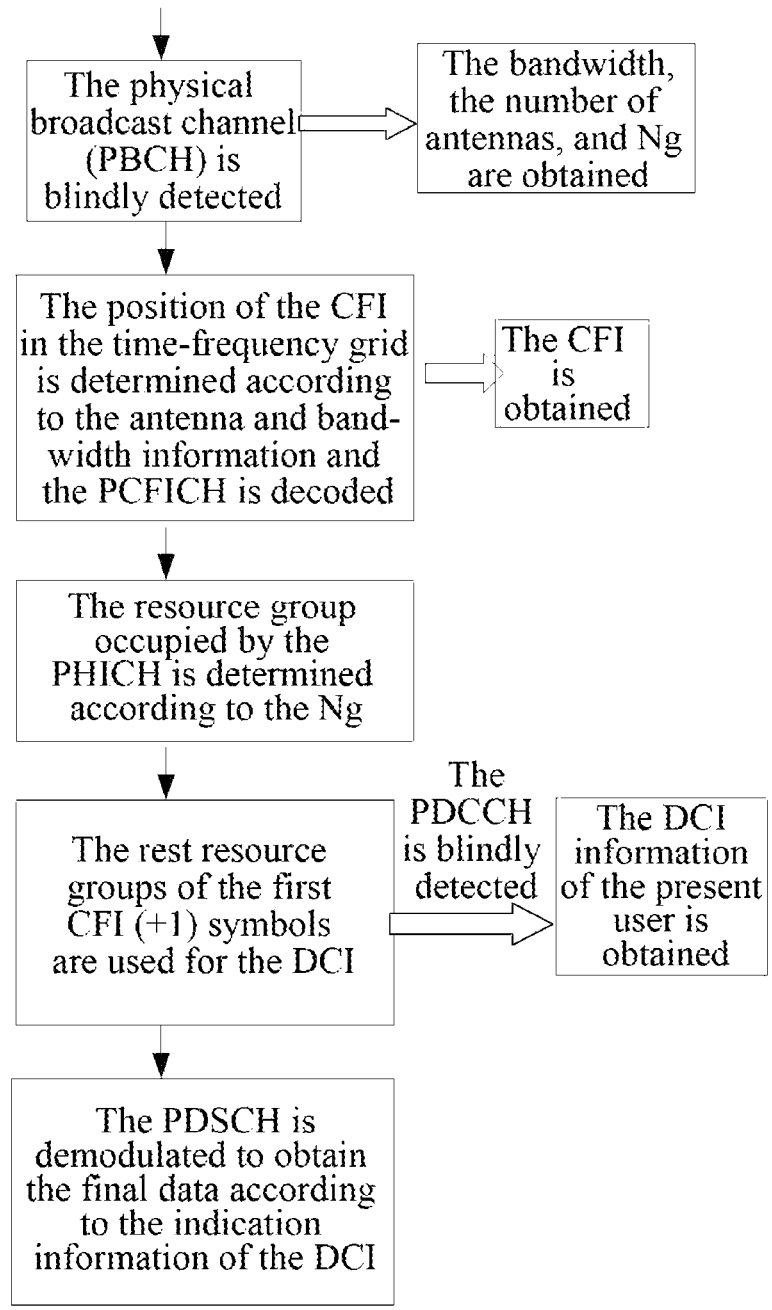
FIG. 4 is a flow chart of a process of receiving downlink data in the LTE system.

The subframe structure in the TDD system is as shown in FIG. 2, wherein the subframe 1 and the subframe 6 are special subframes and consist of DwPTS, GP and UpPTS, the DwPTS is used for transmitting the downlink data channel, and the numbers of symbols included in the subframes corresponding to different special subframe configurations are also different.

The number of symbols occupied by the downlink control channel can be divided into different numbers through the subframe type, the common downlink subframe, the DwPTS subframe and the MBSFN subframe, and the time-domain positions of the same type of downlink control channels are the same. For example, it is to predefine that the control channel of the DwPTS subframe occupies two symbols, the MBSFN subframe occupies two symbols, and each of other common downlink subframes occupies three symbols. In addition, the numbers of symbols occupied by the downlink control channels in the DwPTS subframes in different special subframe configurations also can be predefined as different numbers.

Thus, the terminal can judge the number of symbols occupied by the downlink control channel in each downlink subframe or the time-domain starting position of the downlink data channel according to the known downlink subframe type.

In addition, for different channel types, the positions of the downlink control channels of different subframes or the starting positions of the downlink data channels also can be predefined. For example, for channels transmitting the public messages, the PDSCH starts from the fourth symbol of the subframe, and for the UE-specific messages, the PDSCH starts from the third symbol. The terminal receives the public messages and the specific messages at the corresponding positions of the corresponding subframes according to the predefined position.

In the following, in conjunction with the accompanying drawings, the embodiment 11 of the present document will be described.

Figure 11:
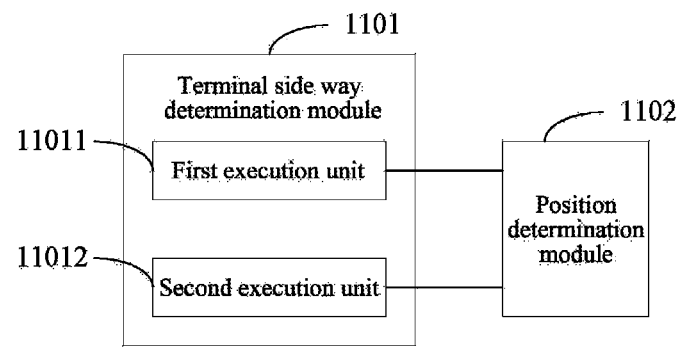
FIG. 11 is a schematic diagram of a structure of a downlink channel time-domain position determination device provided in the embodiment 11 of the present document.

The embodiment of the present document provides a downlink channel time-domain position determination device, and the structure of the device is as shown in FIG. 11, which includes:

a terminal side way determination module 1101, configured to determine a way for acquiring a time-domain position of the downlink control channel and/or a time-domain starting position of a downlink data channel corresponding to the downlink control channel according to the number of repetitions of resources corresponding to the downlink control channel and/or a downlink channel type;

a position determination module 1102, configured to acquire the time-domain position of the downlink control channel and/or the time-domain starting position of the downlink data channel in accordance with the way.

Preferably, the terminal side way determination module 1101 includes:

a first execution unit 11011, configured to: when the number of repetitions is 1, make the terminal acquire the time-domain position of the downlink control channel and/or the time-domain starting position of the downlink data channel according to a PCFICH, when the number of repetitions is greater than 1, and the downlink control channel and the corresponding downlink data channel are transmitted in the same subframe, make the terminal determine the time-domain position of the downlink control channel or the time-domain starting position of the downlink data channel through one of ways of signaling indication, predefinition and blind detection, when the number of repetitions is greater than 1, and the downlink control channel and the corresponding downlink data channel are transmitted in different subframes, make the terminal determine the time-domain position of the downlink control channel through one of ways of signaling indication, predefinition and blind detection, and determine the time-domain starting position of the downlink data channel through the way of signaling indication or predefinition.

Preferably, the terminal side way determination module also includes:

a second execution unit 11012, configured to: when the number of repetitions is 1 and the system bandwidth is a predefined bandwidth, make the terminal obtain the time-domain position of the downlink control channel and/or the time-domain starting position of the downlink data channel according to the PCFICH, when the number of repetitions is greater than 1 or the system bandwidth is not the predefined bandwidth, and the downlink control channel and the corresponding downlink data channel are transmitted in the same subframe, make the terminal determine the time-domain position of the downlink control channel or the time-domain starting position of the downlink data channel through one of ways of signaling indication, predefinition and blind detection, when the number of repetitions is greater than 1 or the system bandwidth is not the predefined bandwidth, and the downlink control channel and the corresponding downlink data channel are transmitted in different subframes, make the terminal determine the time-domain position of the downlink control channel through one of ways of signaling indication, predefinition and blind detection, and determine the time-domain starting position of the corresponding downlink data channel through the way of signaling indication or predefinition.

The downlink channel time-domain position determination device shown in FIG. 11 can be integrated in a terminal and the terminal completes the corresponding functions.

Figure 12:
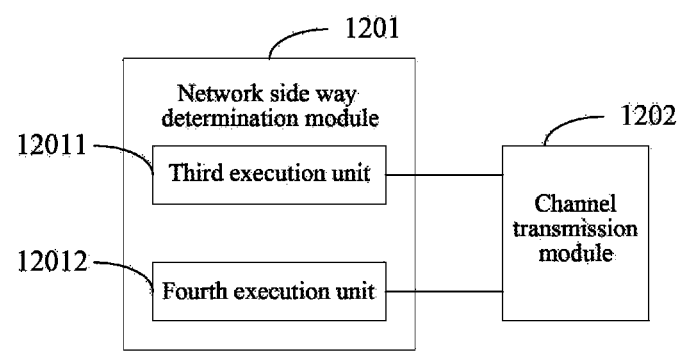
FIG. 12 is a schematic diagram of a structure of another downlink channel time-domain position determination device provided in the embodiment 11 of the present document.

The embodiment of the present document also provides a downlink channel time-domain position determination device at a network side, and the structure of the device is as shown in FIG. 12, which includes:

a network side way determination module 1201, configured to determine a way for acquiring a time-domain position of a downlink control channel and/or a time-domain starting position of a downlink data channel according to the number of repetitions of resources corresponding to the downlink control channel and/or a downlink channel type;

a channel transmission module 1202, configured to transmit the downlink control channel and the downlink data channel according to the time-domain position of the downlink control channel and/or the time-domain starting position of the downlink data channel determined by the way.

Preferably, the network side way determination module 1201 includes:

a third execution unit 12011, configured to: when the number of repetitions is 1, make the base station determine the time-domain position of the downlink control channel and/or the time-domain starting position of the downlink data channel according to the PCFICH, when the number of repetitions is greater than 1, and the downlink control channel and the corresponding downlink data channel are transmitted in the same subframe, make the base station determine the time-domain position of the downlink control channel or the time-domain starting position of the downlink data channel through one of ways of signaling indication, predefinition and blind detection, when the number of repetitions is greater than 1 and the system bandwidth is not a predefined bandwidth, and the downlink control channel and the corresponding downlink data channel are transmitted in different subframes, make the base station determine the time-domain position of the downlink control channel through one of ways of signaling indication, predefinition and blind detection, and determine the time-domain starting position of the corresponding downlink data channel through the way of signaling indication or predefinition.

Preferably, the network side way determination module also includes:

a fourth execution unit 12012, configured to, when the number of repetitions is 1 and the system bandwidth is the predefined bandwidth, make the base station determine the time-domain position of the downlink control channel and/or the time-domain starting position of the downlink data channel according to the PCFICH, when the number of repetitions is greater than 1 or the system bandwidth is not the predefined bandwidth, and the downlink control channel and the corresponding downlink data channel are transmitted in the same subframe, make the base station determine the time-domain position of the downlink control channel or the time-domain starting position of the downlink data channel through one of ways of signaling indication, predefinition and blind detection;

when the number of repetitions is greater than 1 or the system bandwidth is not the predefined bandwidth, and the downlink control channel and the corresponding downlink data channel are transmitted in different subframes, make the base station determine the time-domain position of the downlink control channel through one of ways of signaling indication, predefinition and blind detection, and determine the time-domain starting position of the corresponding downlink data channel through the way of signaling indication or predefinition.

The downlink channel time-domain position determination device shown in FIG. 12 can be integrated in a network side device (such as a base station), and the network side device completes the corresponding functions.

The downlink channel time-domain position determination device provided in the embodiment of the present document can be combined with the downlink channel time-domain position determination method provided in the embodiments 1 to 10 of the present document.

The embodiment of the present document also provides a computer program including program instructions, when the program instructions are executed by a terminal, the terminal can execute the method in the abovementioned embodiments.

The embodiment of the present document also provides a computer program including program instructions, when the program instructions are executed by a base station, the base station can execute the method in the abovementioned embodiments.

The embodiment of the present document also provides a carrier carrying the abovementioned computer programs.

The embodiment of the present document provides a downlink channel time-domain position determination method and device, a terminal or a base station to determine a way for acquiring a time-domain position of a downlink control channel and/or a time-domain starting position of a downlink data channel corresponding to the downlink control channel according to the number of repetitions of resources corresponding to the downlink control channel and/or the downlink channel type, and then according to the way, acquires the time-domain position of the downlink control channel and/or the time-domain starting position of the downlink data channel. With the technical solution provided in the embodiment of the present document, the coverage enhanced MTC terminal can be not subject to the PCFICH, and even if the PCFICH channel is not decoded in advance, the time-domain position of the downlink control channel as well as the time-domain starting position of the downlink data channel can still be determined, and the downlink control and data channels can be correctly demodulated, so as to achieve that the terminal correctly judges the time-domain position of the downlink channel and solve the problem that the terminal correctly receives the downlink data.

The terminal also can accurately judge the time-domain position of the downlink control channel and/or the time-domain starting position of the data channel even without decoding the PCFICH channel, which reduces the complexity of the terminal decoding the downlink subframe. Moreover, by repeatedly transmitting the target data in a plurality of successive units of frames, the coverage of each physical channel is increased and the normal communication with the network is guaranteed.

Those ordinarily people skilled in the art can understand that all or some of the steps of the abovementioned embodiments may be implemented by using a computer program process, and the computer program may be stored in a computer-readable storage medium and executed on an appropriate hardware platform (such as a system, equipment, apparatus, device and so on), and during the execution, one of the steps of the method embodiment or a combination thereof are comprised.

Alternatively, all or some of the steps of the abovementioned embodiments can also be implemented with integrated circuits, these steps may be made into individual integrated circuit modules respectively, or some of the modules or steps can be made into a single integrated circuit module to implement. Therefore, the patent document is not limited to any specific combination of hardware and software.

Each device/functional module/functional unit in the abovementioned embodiments may be implemented with universal computing devices, they can be concentrated on a single computing device or distributed on a network composed of a plurality of computing devices.

When each device/functional module/functional unit in the abovementioned embodiments is implemented in the form of software functional module and sold or used as an individual product, they may be stored in a computer readable storage medium. The abovementioned computer-readable storage medium may be a read-only memory, magnetic or optical disk, and the like.

Anyone familiar with the technical field of the art can easily think of changes or replacements within the technical scope disclosed in the patent document, and the changes or replacements shall fall within the protection scope of the patent document. Therefore, the protection scope of the patent document should be subject to the protection scope of the claims.

INDUSTRIAL APPLICABILITY

With the solution of the embodiment of the present document, a coverage enhanced MTC terminal can be not subject to the PCFICH, and it still can determine the time-domain position of the downlink control channel as well as the time-domain starting position of the downlink data channel even without decoding the PCFICH channel in advance and correctly demodulate the downlink control and data channels, which achieves that the terminal correctly judges the time-domain position of the downlink channel, and solves the problem of the terminal correctly receiving the downlink data.

What is claimed is:

1. A downlink channel time-domain position determination method, comprising:
a terminal determining a way for acquiring a time-domain position of a downlink control channel and/or a time-domain starting position of a downlink data channel corresponding to the downlink control channel according to number of repetitions of resources corresponding to the downlink control channel and/or a downlink channel type;
the terminal acquiring the time-domain position of the downlink control channel and/or the time-domain starting position of the downlink data channel in accordance with the way; wherein, the terminal determining the way for acquiring the time-domain position of the downlink control channel and/or the time-domain starting position of the downlink data channel corresponding to the downlink control channel according to the number of repetitions of resources corresponding to the downlink control channel and/or the downlink channel type comprises:
when the number of repetitions is 1, the terminal acquiring the time-domain position of the downlink control channel and/or the time-domain starting position of the downlink data channel according to a Physical Control Format Indicator Channel (PCFICH);
when the number of repetitions is greater than 1, and the downlink control channel and the corresponding downlink data channel are transmitted in a same subframe, the terminal determining the time-domain position of the downlink control channel or the time-domain starting position of the downlink data channel through one of ways of signaling indication, predefinition and blind detection;
when the number of repetitions is greater than 1, and the downlink control channel and the corresponding downlink data channel are transmitted in different subframes, the terminal determining the time-domain position of the downlink control channel through one of ways of the signaling indication, predefinition and blind detection, and determining the time-domain starting position of the downlink data channel through the way of signaling indication or predefinition; wherein,
the way of predefinition or blind detection is adopted with regard to a channel with a system public channel type, and the way of signaling indication, predefinition or blind detection is adopted with regard to a UE-specific channel; wherein
the signaling indication is borne in a main information block (MIB) transmitted in a physical broadcast channel (PBCH), or borne in a system information block (SIB) transmitted in the downlink data channel, and the SIB is obtained by the terminal directly performing the blind detection on the downlink data channel; wherein, the way of predefinition is the terminal determining the time-domain position of the downlink control channel and/or the time-domain position of the downlink data channel according to at least one of a system bandwidth, a system frame number, a subframe number, a subframe type and a channel type.

2. The downlink channel time-domain position determination method of claim 1, wherein, the terminal determining the way for acquiring the time-domain position of the downlink control channel and/or the time-domain starting position of the downlink data channel corresponding to the downlink control channel according to the number of repetitions of resources corresponding to the downlink control channel and/or the downlink channel type comprises:
when the number of repetitions is 1 and a system bandwidth is a predefined bandwidth, the terminal acquiring the time-domain position of the downlink control channel and/or the time-domain starting position of the downlink data channel according to the PCFICH;
when the number of repetitions is greater than 1 or the system bandwidth is not the predefined bandwidth, and the downlink control channel and the corresponding downlink data channel are transmitted in a same subframe, the terminal determining the time-domain position of the downlink control channel or the time-domain starting position of the downlink data channel through one of ways of signaling indication, predefinition and blind detection;
when the number of repetitions is greater than 1 or the system bandwidth is not the predefined bandwidth, and the downlink control channel and the corresponding downlink data channel are transmitted in different subframes, the terminal determining the time-domain position of the downlink control channel through one of ways of the signaling indication, predefinition and blind detection, and determining the time-domain starting position of the corresponding downlink data channel through the way of signaling indication or predefinition.

3. The downlink channel time-domain position determination method of claim 1, wherein, time-domain positions of a same downlink control channel and/or a same data channel in subframes transmitting a same downlink data channel and/or a same downlink control channel are all the same; or,
the subframes transmitting the same downlink control channel and/or the same downlink data channel are divided into subframe sets, and the time-domain positions of the same downlink control channel and/or the same downlink data channel within a same subframe set are all the same.

4. The downlink channel time-domain position determination method of claim 1, wherein, Control Format Indicator (CFI) values of M subframes corresponding to a blind detection of the downlink control channel are all the same, or through a way of predefining set divisions on the subframes, Control Format Indicator (CFI) values of subframes within different sets are different, and Control Format Indicator (CFI) values of subframes within a same set are the same.

5. The downlink channel time-domain position determination method of claim 4, wherein, when the Control Format Indicator (CFI) values of the M subframes corresponding to the downlink control channel are all the same, the way of blind detection is the terminal sequentially trying three possible values Control Format Indicator (CFI)={1, 2, 3}/{2, 3, 4} or two possible values {2, 3}/{3, 4};
or
when the Control Format Indicator (CFI) values of the M subframes corresponding to the downlink control channel are distinguished through sets, the way of blind detection is the terminal sequentially trying possible values of a combination of Control Format Indicator (CFI) values in each set, calculating a size of a search space, combining and decoding data borne in downlink channels in search spaces corresponding to the M subframes together to check whether Downlink Control Information (DCI) is correct or not, until correct Downlink Control Information (DCI) is blindly detected or the search spaces are all searched.

6. The downlink channel time-domain position determination method of claim 1, wherein, when the downlink control channel and the corresponding downlink data channel are transmitted in the same subframe, methods for determining the time-domain position of the downlink control channel and the time-domain position of the downlink data channel are the same;

when the downlink control channel and the corresponding downlink data channel are transmitted in different subframes, methods for determining the time-domain position of the downlink control channel and the time-domain position of the downlink data channel are configured independently;

or when control information corresponding to a public message and control information corresponding to a user-specific message are independently borne in downlink control channels of different subframes, the time-domain position of the downlink control channel corresponding to the public message and the time-domain position of the downlink control channel corresponding to the user-specific message are respectively configured independently;

or the downlink control channel is a Physical Downlink Control Channel (PDCCH) and/or an enhanced PDCCH (ePDCCH);

or the terminal comprises a coverage enhanced Machine Type Communication (MTC) terminal.

7. A downlink channel time-domain position determination method, comprising:

a base station determining a way for acquiring a time-domain position of a downlink control channel and/or a time-domain starting position of a downlink data channel according to number of repetitions of resources corresponding to the downlink control channel and/or a downlink channel type;

the base station transmitting the downlink control channel and the downlink data channel in accordance with the time-domain position of the downlink control channel and/or the time-domain starting position of the downlink data channel determined through the way; wherein, the terminal determining the way for acquiring the time-domain position of the downlink control channel and/or the time-domain starting position of the downlink data channel according to the number of repetitions of resources corresponding to the downlink control channel and/or the downlink channel type comprises:

when the number of repetitions is 1, the bases station determining the time-domain position of the downlink control channel and/or the time-domain starting position of the downlink data channel according to a PCFICH;

when the number of repetitions is greater than 1 and the downlink control channel and the corresponding downlink data channel are transmitted in a same subframe, the base station determining the time-domain position of the downlink control channel or the time-domain starting position of the downlink data channel through one of ways of signaling indication, predefinition and blind detection;

when the number of repetitions is greater than 1 and a system bandwidth is not a predefined bandwidth, and the downlink control channel and the corresponding downlink data channel are transmitted in different subframes, the base station determining the time-domain position of the downlink control channel through one of ways of the signaling indication, predefinition and blind detection, and determining the time-domain starting position of the corresponding downlink data channel through the way of signaling indication or predefinition; wherein, the way of predefinition or blind detection is adopted with regard to a channel with a system public channel type, and the way of signaling indication, predefinition or blind detection is adopted with regard to a UE-specific channel; or information of the signaling indication is borne in an MIB transmitted in a physical broadcast channel (PBCH), or borne in an System Information Block (SIB) transmitted in the downlink data channel; or the way of predefinition is the base station determining the time-domain position of the downlink control channel and/or the time-domain position of the downlink data channel according to at least one of a system bandwidth, a system frame number, a subframe number, a subframe type and a channel type.

8. The downlink channel time-domain position determination method of claim 7, wherein, the base station determining the way for acquiring the time-domain position of the downlink control channel and/or the time-domain starting position of the downlink data channel according to the number of repetitions of resources corresponding to the downlink control channel and/or the downlink channel type comprises:

when the number of repetitions is 1 and the system bandwidth is the predefined bandwidth, the base station determining the time-domain position of the downlink control channel and/or the time-domain starting position of the downlink data channel according to the PCFICH;

when the number of repetitions is greater than 1 or the system bandwidth is not the predefined bandwidth, and the downlink control channel and the corresponding downlink data channel are transmitted in the same subframe, the base station determining the time-domain position of the downlink control channel or the time-domain starting position of the downlink data channel through one of ways of signaling indication, predefinition and blind detection;

when the number of repetitions is greater than 1 or the system bandwidth is not the predefined bandwidth, and the downlink control channel and the corresponding downlink data channel are transmitted in different subframes, the base station determining the time-domain position of the downlink control channel through one of ways of signaling indication, predefinition and blind detection, and determining the time-domain starting position of the corresponding downlink data channel through the way of signaling indication or predefinition.

9. The downlink channel time-domain position determination method of claim 7, wherein, time-domain positions of a same downlink control channel and/or a same data channel in subframes transmitting a same downlink control channel and/or a same data channel are all the same; or, the subframes transmitting the same downlink control channel and/or the same data channel are divided into subframe sets, and the time-domain positions of the same downlink control channel and/or the same data channel within a same subframe set are all the same.

10. A downlink channel time-domain position determination device, comprising hardware performing instructions stored in a non-transitory computer readable medium which executes steps in following modules:

a terminal side way determination module, configured to: determine a way for acquiring a time-domain position of a downlink control channel and/or a time-domain starting position of a downlink data channel corresponding to the downlink control channel according to number of repetitions of resources corresponding to the downlink control channel and/or a downlink channel type; and a position determination module, configured to: acquire the time-domain position of the downlink control channel and/or the time-domain starting position of the downlink data channel in accordance with the way; wherein, the terminal side way determination module comprises:

a first execution unit, configured to: when the number of repetitions is 1, make a terminal acquire the time-domain position of the downlink control channel and/or the time-domain starting position of the downlink data channel according to a PCFICH, when the number of repetitions is greater than 1, and the downlink control channel and the corresponding downlink data channel are transmitted in a same subframe, make the terminal determine the time-domain position of the downlink control channel or the time-domain starting position of the downlink data channel through one of ways of signaling indication, predefinition and blind detection, when the number of repetitions is greater than 1, and the downlink control channel and the corresponding downlink data channel are transmitted in different subframes, make the terminal determine the time-domain position of the downlink control channel through one of ways of signaling indication, predefinition and blind detection, and determine the time-domain starting position of the downlink data channel through the way of signaling indication or predefinition;

the terminal side way determination module further comprises:

a second execution unit, configured to: when the number of repetitions is 1 and a system bandwidth is a predefined bandwidth, make the terminal obtain the time-domain position of the downlink control channel and/or the time-domain starting position of the downlink data channel according to the PCFICH, when the number of repetitions is greater than 1 or the system bandwidth is not the predefined bandwidth, and the downlink control channel and the corresponding downlink data channel are transmitted in a same subframe, make the terminal determine the time-domain position of the downlink control channel or the time-domain starting position of the downlink data channel through one of ways of signaling indication, predefinition and blind detection, when the number of repetitions is greater than 1 or the system bandwidth is not the predefined bandwidth, and the downlink control channel and the corresponding downlink data channel are transmitted in different subframes, make the terminal determine the time-domain position of the downlink control channel through one of ways of signaling indication, predefinition and blind detection, and determine the time-domain starting position of the corresponding downlink data channel through the way of signaling indication or predefinition; wherein, the way of predefinition or blind detection is adopted with regard to a channel with a system public channel type, and the way of signaling indication, predefinition or blind detection is adopted with regard to a UE-specific channel; wherein the signaling indication is borne in a main information block (MIB) transmitted in a physical broadcast channel (PBCH), or borne in a system information block (SIB) transmitted in the downlink data channel, and the SIB is obtained by the terminal directly performing the blind detection on the downlink data channel; wherein, the way of predefinition is the terminal determining the time-domain position of the downlink control channel and/or the time-domain position of the downlink data channel according to at least one of a system bandwidth, a system frame number, a subframe number, a subframe type and a channel type.

11. A downlink channel time-domain position determination device, comprising hardware performing instructions stored in a non-transitory computer readable medium which executes steps in following modules:

a network side way determination module, configured to determine a way for acquiring a time-domain position of a downlink control channel and/or a time-domain starting position of a downlink data channel according to the number of repetitions of resources corresponding to the downlink control channel and/or a downlink channel type; and a channel transmission module, configured to transmit the downlink control channel and the downlink data channel according to the time-domain position of the downlink control channel and/or the time-domain starting position of the downlink data channel determined by the way; wherein, the network side way determination module comprises:

a third execution unit, configured to: when the number of repetitions is 1, make a base station determine the time-domain position of the downlink control channel and/or the time-domain starting position of the downlink data channel according to a PCFICH, when the number of repetitions is greater than 1, and the downlink control channel and the corresponding downlink data channel are transmitted in a same subframe, make the base station determine the time-domain position of the downlink control channel or the time-domain starting position of the downlink data channel through one of ways of signaling indication, predefinition and blind detection;

when the number of repetitions is greater than 1 and a system bandwidth is not a predefined bandwidth, and the downlink control channel and the corresponding downlink data channel are transmitted in different subframes, make the base station determine the time-domain position of the downlink control channel through one of ways of signaling indication, predefinition and blind detection, and determine the time-domain starting position of the corresponding downlink data channel through the way of signaling indication or predefinition;

the network side way determination module comprises:

a fourth execution unit, configured to: when the number of repetitions is 1 and the system bandwidth is the predefined bandwidth, make the base station determine the time-domain position of the downlink control channel and/or the time-domain starting position of the downlink data channel according to the PCFICH, when the number of repetitions is greater than 1 or the system bandwidth is not the predefined bandwidth, and the downlink control channel and the corresponding downlink data channel are transmitted in the same subframe, make the base station determine the time-domain position of the downlink control channel or the time-domain starting position of the downlink data channel through one of ways of signaling indication, predefinition and blind detection;

when the number of repetitions is greater than 1 or the system bandwidth is not the predefined bandwidth, and the downlink control channel and the corresponding downlink data channel are transmitted in different subframes, make the base station determine the time-domain position of the downlink control channel through one of ways of signaling indication, predefinition and blind detection, and determine the time-domain starting position of the corresponding downlink data channel through the way of signaling indication or predefinition; wherein the way of predefinition or blind detection is adopted with regard to a channel with a system public channel type, and the way of signaling indication, predefinition or blind detection is adopted with regard to a UE-specific channel; or information of the signaling indication is borne in an MIB transmitted in a physical broadcast channel (PBCH), or borne in an System Information Block (SIB) transmitted in the downlink data channel; or the way of predefinition is the base station determining the time-domain position of the downlink control channel and/or the time-domain position of the downlink data channel according to at least one of a system bandwidth, a system frame number, a subframe number, a subframe type and a channel type.

12. A device comprising hardware performing instructions stored in a non-transitory computer readable storage medium, carrying computer program, wherein, computer program comprising program instructions, when the program instructions are executed by a terminal, the terminal can execute the method of claim 1.

13. A The device comprising hardware performing instructions stored in a non-transitory computer readable storage medium carrying the computer program of claim 12.

14. A device comprising hardware performing instructions stored in a non-transitory computer readable storage medium, carrying computer program, wherein, computer program comprising program instructions, when the program instructions are executed by a base station, the base station can execute the method of claim 7.

15. The device comprising hardware performing instructions stored in a non-transitory computer readable storage medium carrying the computer program of claim 14.

* * * * *